Aug. 16, 1927.

E. H. PEABODY 1,639,057

VISCOSIMETER

Filed Nov. 23, 1922

2 Sheets-Sheet 1

INVENTOR
Ernest H Peabody
BY
William R. Pratt
ATTORNEY

Aug. 16, 1927.

E. H. PEABODY 1,639,057

VISCOSIMETER

Filed Nov. 23, 1922

2 Sheets-Sheet 2

INVENTOR
Ernest H Peabody
BY
William R. Pratt
ATTORNEY

Patented Aug. 16, 1927.

1,639,057

UNITED STATES PATENT OFFICE.

ERNEST H. PEABODY, OF PELHAM MANOR, NEW YORK, ASSIGNOR TO PEABODY ENGINEERING CORPORATION, OF NEW YORK, N. Y., A CORPORATION OF NEW YORK.

VISCOSIMETER.

Application filed November 23, 1922. Serial No. 602,779.

My invention relates to an apparatus for determining the temperature to which a liquid or mixture of liquids should be heated before spraying by an atomizer into a combustion chamber and has for its object the production of an instrument for determining the temperature at which a liquid will be reduced in viscosity to the point of successful operation in an atomizer.

In spraying liquids by means of mechanical atomizers in which the liquid is given a high rotary velocity within the tip of the atomizer, the viscosity of the liquid plays a very important part and frequently, as for example in the spraying of viscous oil, the viscosity of the liquid has to be reduced by heating before the liquid is delivered to the atomizer. The temperature to which the liquid must be heated therefore should be ascertained before hand in order to secure the best results, particularly as liquids of various viscosities are used in practice. It frequently happens also that even if laboratory tests of viscosity are made, the data are not accurate owing to the common custom of mixing liquids of various characteristics in the storage tanks. Hence it is desirable that the operating personnel should have some ready means for determining the viscosity of the liquid, at least approximately, or more important still a means of determining the approximate temperature to which the liquid should be heated to reduce the viscosity to the desired point.

While the temperature-viscosity properties of various liquids may vary greatly, particularly mixtures of liquids, the viscosity at which the atomizer will best function is more or less a fixed point and may be assumed as approximately 5° Engler or 180 Saybolt seconds (Universal) or say 18 seconds Furol. If therefore a simple instrument is available for determining the temperature at which a liquid will be reduced in viscosity to this point, the operating force will possess a ready means for guidance in this important factor of operation.

The foregoing and other features of my invention will now be described in connection with the accompanying drawing in which similar characters of reference indicate like parts throughout the several views.

Figure 1:
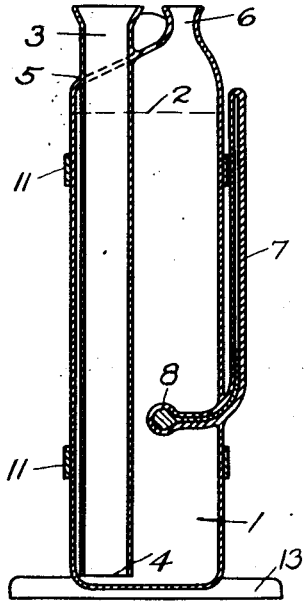
Figure 2:
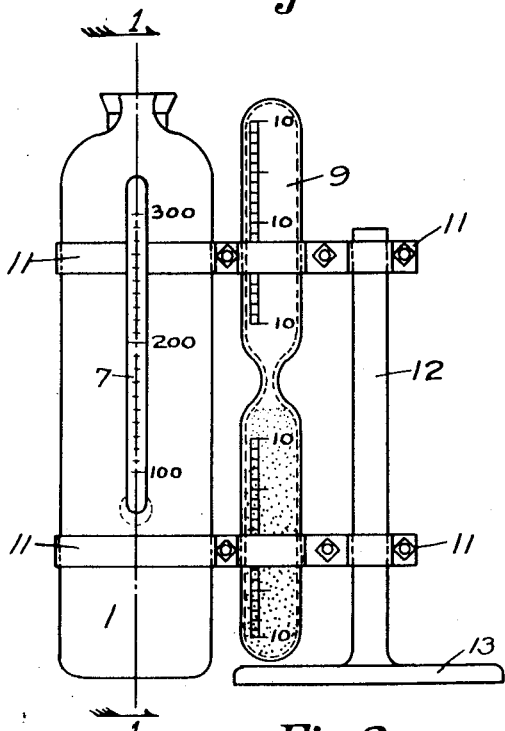

Figure 1 is a section of my viscosimeter along lines 1—1 Figure 2.

Figure 3:
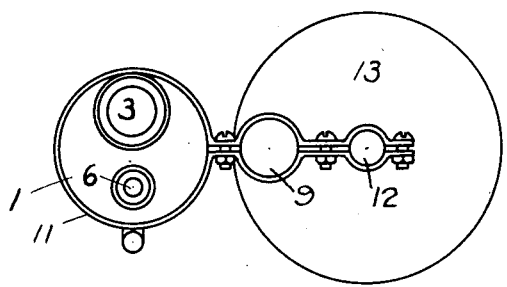
Figure 4:
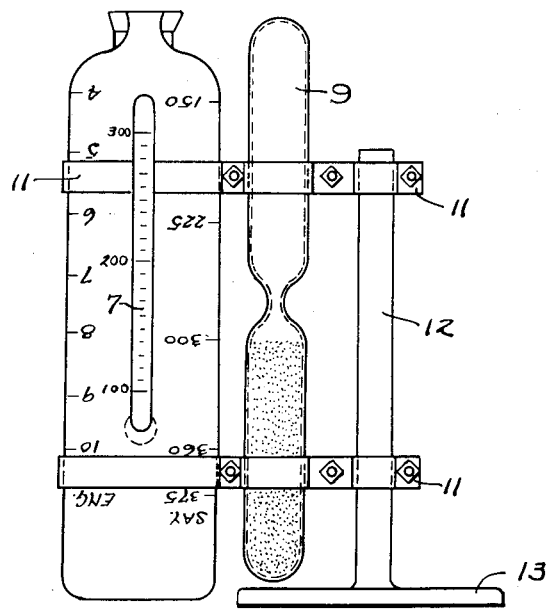
Figure 5:
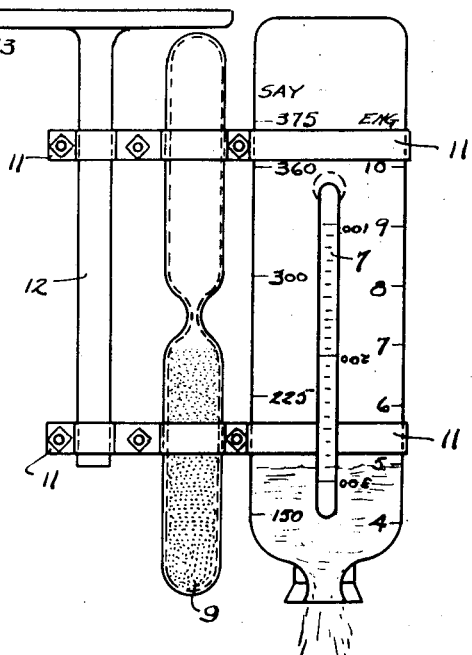

Figure 2 is a side elevation of my device.
Figure 3 is a top view of same.
Figure 4 is a modification which I employ.
Figure 5 is my device illustrating a direct viscosity reading in Saybolt seconds or Engler degrees.

In the carrying out of my invention I employ a glass receptacle 1 of such size that when filled to the mark 2 it will contain a predetermined volume of the liquid. 3 is a glass tube of smaller diameter but of sufficient area to be free from capillary action, which extends from the top of the receptacle 1 to a point 4 near the bottom and is caused to pass through the top wall of the receptacle 1 at 5 so that it will be contained within the receptacle 1 except at the top which is open to the outside. The top of the receptacle 1 is reduced at 6 to form a restricted outlet of predetermined area. A thermometer 7 is attached to the exterior wall of the receptacle 1 but so arranged that the bulb 8 will extend within the receptacle 1 at a predetermined point. This thermometer will be graduated as desired to suit the characteristics of the liquid i. e. the scale will extend above and below the points at which the liquid to be tested will possess the desired viscosity. Thus for heavy fuel oils 100° to 300° F. will be satisfactory.

An ordinary sand glass 9 is provided of such size that the sand will run from the upper to the lower bulb in a time interval which will indicate the desired viscosity, i. e. when the volume measured by the capacity of the receptacle 1 up to the mark, of any liquid of the desired viscosity will completely flow through the orifice 6 under the influence of gravity in the time interval indicated by the sand glass. Certain marks 10—10 may be described on the sand glass if desired, so that fractions of the time interval may be noted but usually the full interval required for all the sand to flow through the glass will be sufficient for the purpose intended.

The receptacle 1 and sand glass 9 may be fastened firmly together by the clips 11 which may also be attached to a handle 12 provided with a pedestal 13 for holding the instrument in an upright position.

The operation is as follows:—A sample of liquid to be tested is poured into the tube 3 which may for convenience be given a flared or funnel form at the top. The liquid flows through this tube into the receptacle 1 and gradually rises to the mark 2 when the supply should at once be cut off. The receptacle 1 and the tube 3 will then be filled with liquid to the level 2, but it is to be noted that the net volume in the receptacle 1 is the quantity which will be subjected to test.

The instrument is then lifted by the handle 12 and held suspended over a flame or other source of heat. If desired a wire coil may be used in contact with the receptacle 1, and heated by an electric current. The apparatus from time to time may be shaken gently to stir the liquid as it gradually rises in temperature, or if desired a stirring mechanism may be employed.

Usually the operator will have some general idea as to the temperature to which the liquid should be heated and he will bring the temperature as indicated by the thermometer to approximately this point. Let us assume that he first makes a test at say 150° F. When the temperature reaches this point he quickly turns the instrument upside down holding it over a receptacle into which the oil may flow. The liquid in the tube 3 will instantly flow out as this tube is made of relatively large area and air will freely find its way to the top. Thus air flowing through the tube 3 will at once reach the point 4 and flow into the receptacle 1 in its reversed position, when the liquid in this tube will begin to flow out through the orifice 6. At the same moment the sand will begin to flow through the glass. The operator watches to see whether all the liquid flows out of the orifice 6 before the glass is empty or whether the glass is emptied while there is still some liquid within the receptacle 1. If all the liquid flows out first he knows that the viscosity is lower than required. If the sand flows out first the liquid is still too viscous, i. e. the desired temperature is higher than 150° F. Assume that the latter condition is found. The operator then repeats the test, this time allowing the temperature to reach say 200° F. before reversing the instrument. After a few trials he will find that when the liquid is heated to a definite temperature both the receptacle 1 and the sand glass will be emptied at the same instant, and when this condition occurs, the viscosity is at the desired point and the desired temperature has been determined.

It is obvious that the proportion of the receptacle 1, the area of the orifice 6 and the size of the sand glass may be so adjusted as to show any desired viscosity by means of the simultaneous emptying of receptacle 1 and the sand glass. Close adjustment may also readily be made by scribing the mark 2 after finally calibrating the instrument. However should it be found more convenient in practice to dispense with the mark 2 entirely and fill the receptacle 1 and tube 3 to the overflow point, this may easily be done and final calibration be made by selecting the proper sand glass interval.

It will be readily understood that I may employ graduations on the receptacle to show the percentage of liquid emptied out in a given time interval, and this may be the preferred form in which I will use my invention, for with this arrangement as shown specifically in Figures 4 and 5 it is only necessary to heat up the liquid, reverse the instrument and read the viscosity in Saybolt seconds (Universal), Engler degrees or on other scales.

While the form of receptacle shown is that preferred by me, any form of reversible self emptying tube may be used, and the sand glass may be replaced by some other means for measuring the time intervals, as for example a metronome attachment or a simple pendulum may be used for the purpose.

It is obvious that in heating the oil in the receptacle it will expand in volume and the level will rise above the mark 2. Therefore before reversing the instrument when ready for the test the excess volume of oil should be removed by means of a dropper or siphon or in any desired manner and the level brought back to the mark 2.

I claim:

1. A viscosimeter comprising a receptacle for a liquid which may be filled in one position and emptied in another position, and means automatically brought into operation simultaneously with the change in position of the receptacle for measuring the time consumed by the liquid in flowing out of the receptacle.

2. A viscosimeter comprising a receptacle for a liquid adapted to receive the liquid when in one position, and a time measuring device associated therewith adapted to measure the time consumed by the flow of the liquid from the receptacle when it is in its reverse position, said time measuring device being brought into operation by movement of the receptacle to the reverse position.

3. A viscosimeter comprising a receptacle for a liquid having an outflow passage at its top, and a time measuring device mounted to begin to function when the viscosimeter is inverted to cause the liquid to flow from the receptacle.

4. A device as recited in claim 3 in which the receptacle is provided with a restricted neck.

5. A device as recited in claim 3 in which the receptacle is provided with inlet and outlet ports.

6. A device as recited in claim 3 in which the time measuring device is a sand glass.

7. A device as recited in claim 3 in which the receptacle is provided with an inlet tube extending substantially to the bottom thereof.

8. A device as recited in claim 3 in which the receptacle is provided with an inlet tube having an opening near the receptacle top and a body portion extending substantially to the bottom of the receptacle.

9. A viscosimeter comprising a receptacle for a liquid, means for determining the temperature of a liquid in the receptacle, a time measuring device, and means whereby the time measuring device will begin to function when the liquid is caused to flow from the receptacle.

10. A viscosimeter comprising a receptacle for liquid and means for measuring the time required to empty the receptacle which means automatically begins to function simultaneously with the beginning of flow of liquid from the receptacle.

11. A device as recited in claim 10 in which the receptacle is provided with a filling member extending substantially to the bottom thereof and a restricted discharge opening.

12. A viscosimeter comprising a receptacle for holding liquid to be tested, a sand glass time mechanism, and means connecting the receptacle and sand glass so that the flow of liquid from the receptacle and the measurement of time consumed thereby may begin simultaneously.

13. A method for determining the viscosity of a liquid which comprises placing the same in a receptacle, heating the liquid to the desired temperature, and automatically measuring the time consumed in the flow of the heated liquid from the receptacle by correlating the starting of the flow with the starting of the time measuring means.

14. A method for determining the viscosity of a liquid which comprises placing a predetermined quantity in a receptacle, heating the liquid, and automatically measuring the time consumed in the flow of the heated liquid from the receptacle by correlating the starting of the flow with the starting of the time measuring means.

15. A method for determining the viscosity of a liquid which comprises heating a predetermined quantity in a receptacle, and automatically measuring the time consumed in the flow of the heated liquid from the receptacle by correlating the starting of the flow with the starting of the time measuring means.

16. A method for determining the viscosity of a liquid which comprises placing the same in a receptacle, heating the liquid and automatically measuring the viscosity of liquid flowing out in a predetermined time interval by correlating the starting of the flow with the starting of the time measuring means.

17. A viscosimeter comprising a receptacle for holding liquid to be tested, means for indicating a predetermined time interval, and means on the receptacle to indicate the viscosity of liquid which will flow out of the receptacle in the given time.

18. A viscosimeter comprising a receptacle for liquids, and means for measuring the viscosity of liquid emptied out in a given time interval when the receptacle is reversed, said means being brought into operation by movement of the receptacle to reversed position.

19. A viscosimeter comprising a receptacle for liquid having two openings at the top, one opening for filling and another opening for emptying when in reverse position, the construction being such that the liquid cannot flow out of the filling opening when the receptacle is in reverse position.

In testimony whereof I affix my signature.

ERNEST H. PEABODY.